US012694683B2

(12) United States Patent
Martin

(10) Patent No.: US 12,694,683 B2
(45) Date of Patent: *Jul. 28, 2026

(54) EXPEDITED SPORTS AND ENTERTAINMENT VENUE VALIDATED ENTRY PLATFORM AND METHOD

(71) Applicant: Todd Martin, Aubrey, TX (US)

(72) Inventor: Todd Martin, Aubrey, TX (US)

(73) Assignee: FaceIT Holdings, LLC, Aubrey, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/540,658

(22) Filed: Feb. 14, 2026

(65) Prior Publication Data

US 2026/0179386 A1      Jun. 25, 2026

Related U.S. Application Data

(63) Continuation of application No. PCT/US2024/041941, filed on Aug. 12, 2024.

(60) Provisional application No. 63/616,675, filed on Dec. 31, 2023, provisional application No. 63/532,638, filed on Aug. 14, 2023.

(51) Int. Cl.
| | |
|---|---|
| *G06V 20/52* | (2022.01) |
| *G06Q 50/12* | (2012.01) |
| *G06V 10/82* | (2022.01) |
| *G06V 40/16* | (2022.01) |
| *G06V 40/20* | (2022.01) |
| *G08B 13/196* | (2006.01) |

(52) U.S. Cl.
CPC .............. *G06V 20/52* (2022.01); *G06V 10/82* (2022.01); *G06V 40/172* (2022.01); *G06V 40/20* (2022.01); *G08B 13/19613* (2013.01); *G06Q 50/12* (2013.01)

(58) Field of Classification Search
CPC ...... G06V 40/172; G06V 10/82; G06V 40/20; G08B 13/19613; G06Q 50/12
See application file for complete search history.

(56) References Cited

U.S. PATENT DOCUMENTS

| | | | | |
|---|---|---|---|---|
| 10,946,793 | B1 * | 3/2021 | Ekin | ...................... G08G 1/052 |
| 11,151,481 | B1 | 10/2021 | Sun | |
| 11,217,076 | B1 | 1/2022 | Siminoff et al. | |
| 11,625,665 | B1 | 4/2023 | Martin | |
| 11,755,986 | B1 | 9/2023 | Martin | |
| 12,340,338 | B2 | 6/2025 | Martin | |
| 2019/0325682 | A1 | 10/2019 | Petkov et al. | |
| 2020/0064444 | A1 | 2/2020 | Regani et al. | |
| 2020/0135004 | A1 | 4/2020 | Ellenbogen | |
| 2021/0358244 | A1 * | 11/2021 | Chafni | ...................... G06N 3/09 |
| 2022/0215708 | A1 | 7/2022 | Reynolds, III et al. | |
| 2023/0011644 | A1 | 1/2023 | Kuiper et al. | |
| 2023/0042956 | A1 * | 2/2023 | Carter | ................... B64D 47/02 |
| 2023/0419237 | A1 * | 12/2023 | Martin | ................. G06Q 10/083 |

(Continued)

*Primary Examiner* — Jae N Noh
(74) *Attorney, Agent, or Firm* — Todd Martin

(57) ABSTRACT

A system and method to validate people for entry into a sports or entertainment venue using in-motion facial authentication and walk-thru body scanning for prohibited objects so that venue entrants may enter a facility substantially without stopping. Entrants proceed through a chute (450), and after being facially authenticated and scanned for prohibited object shapes, a processor (402) displays whether a person is cleared for entry.

19 Claims, 6 Drawing Sheets

(56)                    References Cited

U.S. PATENT DOCUMENTS

| | | |
|---|---|---|
| 2025/0218245 A1 | 7/2025 | Martin |
| 2025/0299148 A1 | 9/2025 | Martin |

* cited by examiner

100

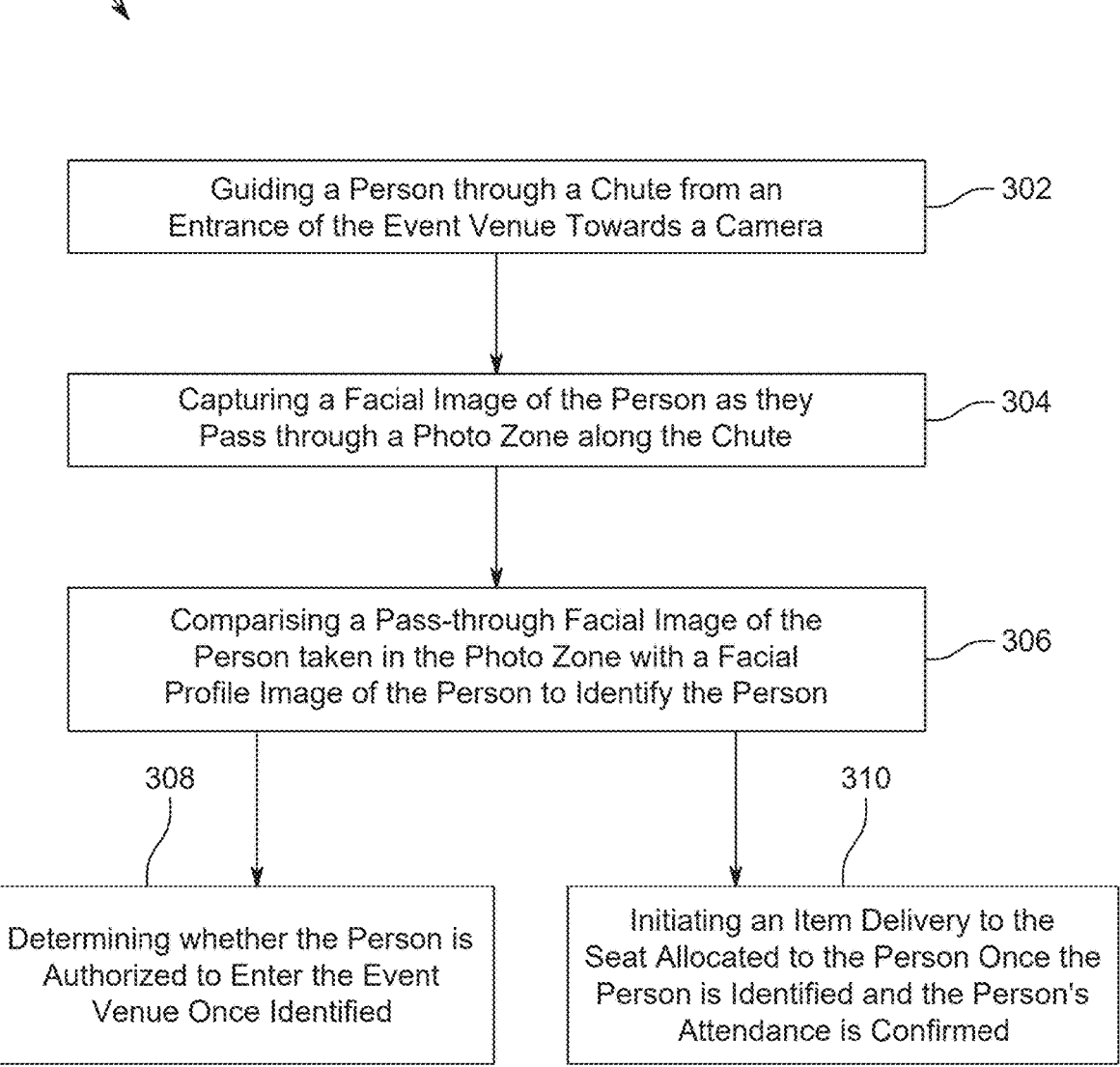

300

| 302 — Guiding a Person through a Chute from an Entrance of the Event Venue Towards a Camera |

| 304 — Capturing a Facial Image of the Person as they Pass through a Photo Zone along the Chute |

| 306 — Comparising a Pass-through Facial Image of the Person taken in the Photo Zone with a Facial Profile Image of the Person to Identify the Person |

308 — Determining whether the Person is Authorized to Enter the Event Venue Once Identified 310 — Initiating an Item Delivery to the Seat Allocated to the Person Once the Person is Identified and the Person's Attendance is Confirmed

FIG. 5

ID: Jean
xxx,1970
Status : Clear

EXPEDITED SPORTS AND ENTERTAINMENT VENUE VALIDATED ENTRY PLATFORM AND METHOD

The present application is a continuation of PCT/US2024/041941, which claims the benefit of U.S. Provisional Application No. 63/532,638, and U.S. Provisional Application No. 63/616,675, all of which are incorporated by reference herein.

FIELD OF THE INVENTION

The present disclosure relates to improvements in systems, platforms, and methods for facilitating expeditious controlled entry and identification of an influx of people or entrants to a secured access area at a venue without overwhelming venue employees.

BACKGROUND OF THE INVENTION

Increasingly, security and safety have become major concerns at transportation hubs and event venues. Despite security being a known concern, a problem around security relates how to expeditiously convey people through a security or entry checkpoint. Checkpoints with overly complex systems or equipment can result in delays of entrants hoping to arrive in time for an event or flight, leading to agitated entrants. Agitated entrants can lead to situations where small annoyances become triggers for some people to disproportionally react in a negative, and sometimes violent way. And yet, venue operators often have an obligation to ensure safety of entrants to the furthest extent reasonably possible, whether to comply with a legal requirement, or for liability reasons. Therefore, venue operators need to balance security obligations with trying to minimize entrant annoyance.

What is needed is a system, platform, and method that renders the entry process and event attendance more efficient and fulfilling while minimalizing potential for errors.

SUMMARY

In a preferred aspect, the present disclosure sets forth a system or platform to validate people into a spectator event at the venue. The system includes a guided entryway having an entrance, an exit, a first sidewall and an opposed second sidewall, at least one of the sidewalls extending from the entrance to the exit, at least one of the sidewalls including a panel with a walk-thru body scanner configured detect an object having characteristics matching predetermined characteristics of one or more items on a banned item list. The system also includes a facial data collection device configured to gather facial data of at least one person moving along a portion of the entryway; a detection sensor synced to the facial data collection device to initiate data capture with the device as the person encounters a detection zone to activate the sensor; a user image database configured to store profile image data of the person prior to commencement of the event, the profile image data representing the person in a stationary pose; and a processor. The processor is configured to: compare any object detected by the walk-thru scanner with predetermined characteristics of an object on a banned object list to determine if the person is carrying a banned object; compare the profile image data stored in the user image database with the facial data of the person in motion captured by the facial data collection device using wild facial recognition technology; determine, as the person is moving through the entryway, whether the person is: an authorized venue entrant based on the comparison between the profile image data and the in-motion facial data; and carrying a banned object. The processor is also configured to issue an alert regarding the person attempting entry to the venue after determining that the person is carrying a banned object and/or is an unauthorized entrant to the venue.

In a further preferred aspect, the present disclosure sets forth a method for method for expediting validation of a person through entry into a sports or entertainment venue. The method includes guiding the person to move through a walk-thru body scanner; scanning, with the walk-thru body scanner, the person to detect presence an object having at least one characteristic matching a characteristic of an object on a banned object listing; collecting facial data, with a facial data collection device, of the person as they move through the walk-thru body scanner; determining, with a wild facial recognition technology comparison between profile image data and in-motion facial data, whether the person is an authorized venue entrant as they move through the walk-thru body scanner; and issuing an alert regarding the person if the person is carrying a banned object or is attempting an unauthorized entry into the venue.

In a further preferred aspect, the present disclosure sets forth a ticketless mass spectator event venue entry system for facilitating expeditious and controlled entry of an influx of people to the spectator event without overwhelming event venue employees. The system includes a guided entryway including an entrance, an exit, a first sidewall and an opposed second sidewall, the sidewalls extending from the entrance to the exit, the entryway including a cross beam extending laterally from the first sidewall to the second sidewall at a height of at least 7 feet; a full-body scanner incorporated into the entryway; a camera projecting from the cross beam configured with a field of view spanning the distance between the first sidewall to the second sidewall, the camera being configured to capture a series of pass-through images of a person as they move through the entryway; a detection sensor synced to the camera to initiate image capture with the camera as the person encounters a detection zone to activate the sensor; a user image database configured to store a profile image of the person prior to commencement of the event; and a processor. The processor is configured to: receive data from the scanner to determine presence of a weapon being carried by the person; compare the profile image stored in the user image database with the pass-through image of the person captured by the camera using facial recognition technology; determine whether the person is an authorized entrant as they move through the entryway based on the comparison between the profile image and the pass-through image, the processor being configured to analyze the image series and select an image therefrom based on a minimum threshold including optical recognition of key facial data points, wherein the minimum threshold is based on a percentage of accuracy, the processor being configured to identify the person using only facial recognition technology as a primary method of identification, the processor being configured to use a secondary method of identification where the minimum threshold is not reached; and issue an alert after detection of a weapon being carried by the person, and/or determining that the person is an unauthorized entrant.

In an additional preferred aspect, the present disclosure sets forth a method for ticketless mass spectator event venue entry for facilitating expeditious and controlled entry of an influx of people to the spectator event without overwhelming event venue employees. The method includes: permitting a person to enter through a guided entryway; conducting a full body scan of the person as they move along the entryway; detecting, with a detection sensor, the person moving along the entryway; taking a series of pass-through images of the person as they move along the entryway with a camera synced to the detection sensor to initiate image capture with the camera; conducting, as a primary method of identification, a facial recognition comparison of at least one of the pass-through images of the person with a personal profile image of the person contained in a personal profile associated with person, as the person moves along the entryway, the conducting of the facial recognition comparison including determining whether at least one of the pass-through images meets a minimum threshold including optical recognition of key facial data points, wherein the minimum threshold is based on a percentage of accuracy, the personal profile including a pre-authorization for event entry; determining the minimum threshold is not reached, and conducting a secondary method of identification; and issuing an alert after detection of a weapon being carried by the person, and/or determining that the person is an unauthorized entrant.

In yet another preferred aspect, the present disclosure sets forth a system or platform for transportation venue security for controlled and expeditious entry of entrants into a secured area or through a border crossing. The platform includes a camera positioned proximate an entryway into a venue or border crossing, the camera being configured to capture image data of entrants as they approach the secured area. The platform includes a database configured to store a plurality of user profiles, each profile including user facial data and contact details. The platform further includes a processor configured to: compare image data of an entrant captured by the camera with facial data stored in the database using Wild Facial Recognition technology to generate an identity confidence rating of the entrant; determine if the identity confidence rating of the entrant meets a predetermined minimum threshold; access user background profile data when the identity confidence rating meets the predetermined minimum threshold to ascertain the entrant's risk rating; and provide a visual indicator. The visual indicator is an indicator to one of: permit the entrant to enter with a walk-thru body scan; deny the entrant entry to the venue; or divert the entrant to a full body scanner utilizing stationary scanning technology.

In yet a further preferred aspect, the present disclosure sets forth a method for controlling and expediting entry of entrants into a secured area or through a border crossing. The method includes comparing image data of an entrant captured by a camera with facial data stored in a database using Wild Facial Recognition technology to generate an identity confidence rating of the entrant; determining if the identity confidence rating of the entrant meets a predetermined minimum threshold; accessing user background profile data when the identity confidence rating meets the predetermined minimum threshold to ascertain the entrant's risk rating; and providing a visual indicator. The visual indicator is to one of: permit the entrant to enter with a walk-thru body scan; deny the entrant entry to the venue; or divert the entrant to a full body scanner utilizing stationary scanning technology.

As used herein, "configured" includes creating, changing, or modifying a program on a computer or network of computers so that the computer or network of computers behave according to a set of instructions. The programming to accomplish the various embodiments described herein will be apparent to a person of ordinary skill in the art after reviewing the present specification, and for simplicity, is not detailed herein. The programming may be stored on a computer readable medium, such as, but not limited to, a non-transitory computer readable storage medium (for example, hard disk, RAM, ROM, CD-ROM, USB memory stick, or other physical device), and/or the Cloud. The system may be implemented on a field-programable gate array and graphics processing unit.

It will be appreciated that in one or more embodiments, the system may include one or more workstations at a back end for use by a platform operator, one or more local client computers for access by users, and a communications network that facilitates communication between the platform, the workstations at the back end, and the client computers. Preferably, the workstations and client computers will include a display and means for entering information, such as a Graphic User Interface (GUI), a keyboard and/or voice activated data entry. Means for accessing the platform by users may include, but are not limited to personal computers and mobile devices such as tablets and smartphones, and other user devices capable of communicating over a communications network utilizing the Internet.

It is to be understood that both the foregoing general description and the following detailed description are exemplary and explanatory only and are not restrictive of the invention, as claimed, unless otherwise stated. In the present specification and claims, the word "comprising" and its derivatives including "comprises" and "comprise" include each of the stated integers, but does not exclude the inclusion of one or more further integers. As defined herein, an "image" may include any one or more of a photograph, picture, scan, and a digital representation of a person and/or object. The phrases "walk-thru," "flow-thru," "flow-through," and "free-flowing" relate to image recognition or facial recognition while the person is in motion (e.g., not stationary). The term "ticketless" relates to a situation where no paper ticket, or representation on a display of a mobile device (e.g., a barcode or QR code) is needed. It will be understood that facial authentication uses facial recognition technology for identification; a primary difference lying in that facial "authentication" relates to active participation by the participant in the facial identification process (e.g., the participant taking a "selfie" for upload to the system). A "profile" image, picture, or profile image data relates to an image or data associated with a person while in a stationary pose (standing or sitting). The claims as filed with this application are hereby incorporated by reference in the description.

The accompanying drawings, which are incorporated in and constitute a part of this specification, illustrate several embodiments of the invention and together with the description, serve to explain the principles of one or more forms of the invention.

BRIEF DESCRIPTION OF THE FIGURES

FIG. 5 is a flow diagram of a method for mass spectator event venue entry and item delivery system for facilitating expeditious and controlled entry of an influx of people to the event in accordance with an embodiment of the disclosure.

DETAILED DESCRIPTION OF THE DRAWINGS

Reference will now be made in detail to exemplary embodiments of the invention, some of which are illustrated in the accompanying drawing.

It will be appreciated that although the platform described below will be described in relation to sports and entertainment venues, the platform and method is applicable to a variety of venues, such as a transportation venue. Entrants may be attendees such as spectators, fans, delegates, or other authorized persons, or passengers. A particular label attributed to a person depends on the context of the reason for entry, or event they are attending, but the below-described system/platform and method is applicable to a wide variety of secured venue entry opportunities and mass attendance events without limitation to a particular type of venue type, mass attendance event, gathering, or situation.

Figure 1:
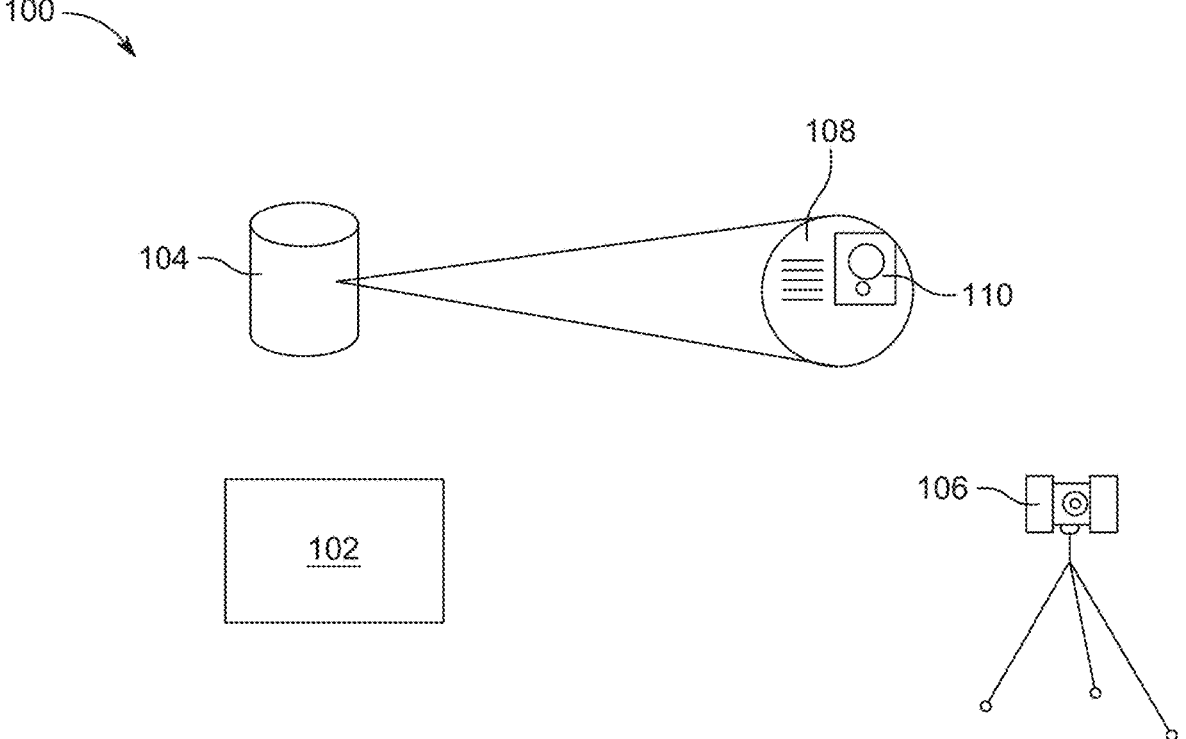
FIG. 1 is a diagram of system components in accordance with an embodiment of the disclosure.

FIG. 1 shows a preferred embodiment of a platform or system 100 having a processor 102, an electronic database 104 configured to store a plurality of user profiles, and at least one digital image data collection device 106, such as, for example only, a camera. In use, a digital profile image of a person is captured, and data associated therewith stored in electronic image database 104 prior to the attempted entry of the entrant into the venue. The person or entrant shows up to the sports or entertainment venue before the scheduled event start, or shows up to the transportation venue the day they are scheduled to depart (as the situation warrants). A camera 106 located proximate the venue entry captures an entry image of the person, which is compared by processor 102 with the profile image stored on database 104 to identify the person. Once the person is identified at the venue, their personal profile is checked for the presence of a pre-authorisation for entry (e.g., a game ticket, concert ticket, or passenger ticket), and if concessional sales are involved, any selection of one or more items for procurement and delivery to the person at an allocated seating of the person, all just by moving through the photo zone. The image used to identify the person may also be used as part of security check against a database of people with security concerns and/or incidents. The preferred elements of system 100 and their interrelationship are described below.

Referring to FIG. 1, system 100 is preferably a stand-alone system which may be in communication with a venue intranet, and/or the internet if desired. Processor 102 may be in the form of a microprocessor integrated with a camera within a camera housing. Processor 102 preferably includes a microchip, such as a System on Chip (SoC), with appropriate control circuitry. Processor 102 is preferably programmed with facial recognition technology so that facial images may be compared with each other to ascertain a match. Examples of suitable recognition algorithms include 3-D modelling, geometric and/or photometric approaches, linear discriminate analysis (LDA), support vector machine (SVM), Support Vector Machine-Recursive Feature Elimination (SVM-RFE), pattern matching, dynamic link matching, thermal imaging, video wild facial recognition, and/or elastic bunch graph matching. Details of suitable facial recognition algorithms would be understood by those of ordinary skill in the art. For example, wild facial recognition is described in the article "*Face Recognition in the Wild*" by Dhifli et al. (Procedia Computer Science 96 (2016), pp 1571-1580), the details of which are incorporated by reference herein to the extent they are needed. Granulated pixel analysis may be used in combination with any one or more of the foregoing algorithms where images may contain a fuzzy or blurry object (or face). Flow-thru facial recognition preferably utilizes a plurality of images of the person in motion, which will typically involve a plurality of facial images of varying confidence scores. A successful match may be determined based on a pre-set minimal threshold being achieved over an image series. The details of image recognition technology would be appreciated by those of ordinary skill in the art and are therefore not repeated here for simplicity. It will be appreciated that elements of the system, platform and method are also interchangeably useable with facial authentication unless otherwise mentioned.

Electronic spectator database 104 is preferably configured with a plurality of user profiles 108 with fields for user identification data such as name, address and contact details (electronic and telephone). Each user profile 108 preferably includes a provision for a digital profile image 110 for association with each person. Profile image 110 is preferably a picture that contains at least a facial portion of the person. The profile image may be obtained through the use of an App on a mobile device if desired, for example, by taking a photo with the person's smartphone ("selfie"), or otherwise uploading a profile image to the platform. A profile image may also exist on a database of images of people associated with security concerns and/or incidents. Each user profile 108 also preferably includes one of more fields for entry or selection of an item for procurement, and optional delivery to any assigned seating of the person. Examples of item(s) that may be selected for procurement and delivery include, but are not limited to, an item of consumable food, a beverage, a souvenir, clothing, an event program, and/or a non-fungible token (NFT), such as an NFT associated with one or more sports personalities. In the situation where the item is an NFT item, the NFT may be electronically delivered to an account associated with the person, either while the person is attending the event, or at a time after conclusion of the particular event the person is attending.

A security image database of user images associated with security incidents may be accessed to enhance venue security. The security database preferably includes images of people that represent a security risk after one or more of such people are logged into the database as being associated with a security situation, incident or event. Examples of security situations for sporting and entertainment venues might include fan fights, thefts or other events that typically catch the attention of venue security. Preferably, the security image database is separate and independent of image database 104, and may include one or more facial images associated with security risks or incidents.

A ledger of event entries for each person may be maintained using blockchain technology if desired. The details of blockchain technology would be appreciated by those of ordinary skill in the art.

The potential for misuse of facial recognition is high if not carefully managed. The public does not easily trust a large company with the use of private, personal data. To alleviate these legitimate concerns, one or more aspects of personal profile 108 may be configured to automatically self-delete after a predetermined amount of time and/or after a predetermined action or event. For example, one or more aspects of personal profile 108 may self-delete after a fixed time period of 3 days, 1 month, 3 months, 1 year or 3 years in order to help ensure that a profile picture is kept up to date, or address privacy concerns, or even once the person has been confirmed as having entered into the sporting event for the intended day of entry. Profile 108 may self-delete after conclusion of the event, such as a sporting event in which the person attends.

System 100 further preferably includes at least one digital image collection device such as camera 106. The digital image collection device may be any device or means configured to capture a digital image, such as, but not limited to a camera, for example, a stand-alone digital camera, a video camera, a thermal camera, and/or a device having an integrated or component camera, such as a tablet computer, a laptop computer, or a mobile communications device such as a smartphone. Digital images captured by the digital image collection device may be stored on a computer-readable storage medium associated with processor 102 (for example, hard disk, server, Cloud); and/or a computer-readable storage medium associated with the digital image collection device; and/or a separate, transferable computer-readable storage medium (for example, flash drive (USB) or disc). Images may include static images or frames from a video.

Camera 106 may be adapted for depth-detection and may include a laser and/or a 3-D rangefinder to facilitate depth detection.

In use, a person creates a digital personal profile. The person provides their identity data into predefined fields and uploads a profile image to database 104. The profile image may be converted to a template of digital data so that no actual picture of the person is later stored in a database. If the event venue offers items or services for procurement and/or delivery, the person may select a desired item/service from a menu, or may otherwise enter an item/service for procurement/delivery into one or more fields of the personal profile. Selection of the item/service is preferably completed prior to entry of the person into the transportation or sporting event venue, and more preferably, before the person moves through a photo zone (described further below). Once the person has established their profile on database 104, the person may travel to the venue and proceed with the entry/item procurement and delivery process, detailed further below.

Figure 2B:
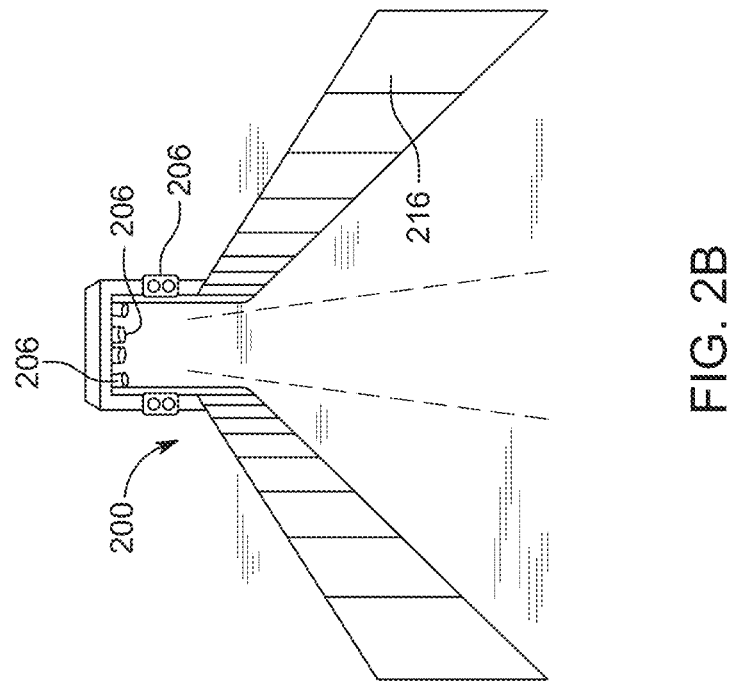
FIG. 2B is a front perspective view of a guided entryway to a photo zone, which a series of alternating overhead cameras at the end of the entry way.
Figure 2A:
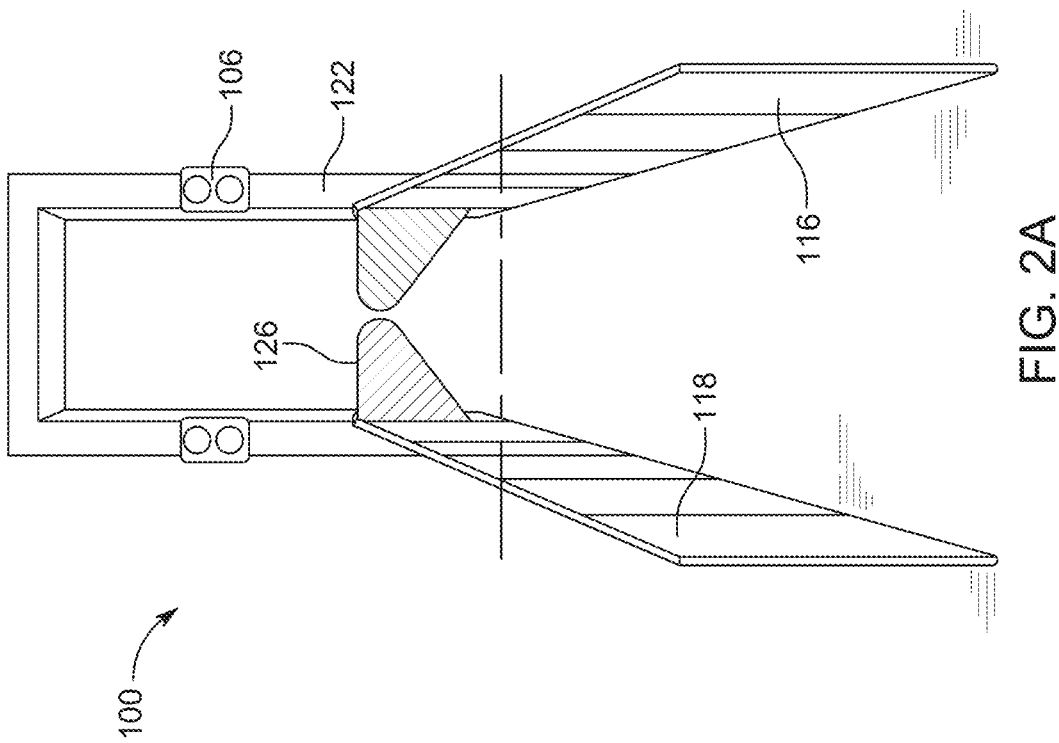
FIG. 2A is front perspective view of a guided entryway to a photo zone where one or more nearby cameras take one or more images of a person as they move through, with doors or barriers.

FIG. 2A shows an entryway configuration leading to a secured access area. An entryway, lane or chute 116 is placed at an entrance to guide entrants from an entrance towards one or more cameras 106. Chute 116 includes a barrier wall 118 that leads to restricted area 120. Chute 116 preferably includes a gantry 122 at an end furthest away from the entrance, e.g., an exit. Gantry 122 includes one or more of cameras 106, which may be placed on a pole of the gantry, or separately of the gantry. Chute 116 further leads to a photo zone just prior to gantry 122. The photo zone is preferably an area where the spectators or passengers pass or move through while their picture is taken for purposes of a facial recognition identification (described further below). A detection sensor synced to one or more of cameras 106 may be configured to initiate image capture as at least one person encounters the photo zone. Particular details of the detection sensor would be appreciated by those in the field. Examples of detection sensors include proximity sensors, photoelectric sensors, vision and imaging sensors, and even pressure and/or temperature sensors. The entryway configuration may include a barrier or one or more doors 126 that processor 102 activates to close in response to a determination that the entrant is to be denied entry. Doors 126, where present, may be configured to be always open except when receiving a signal to close in response to a determination that the entrant is to be denied entry or passage through the entryway. In other words, the barrier may be configured to close only if a determination indicates that the entrant is to be denied entry. Other pathway barriers or blocking means may be used if desired, such as a turnstile.

Figures 3, 4:
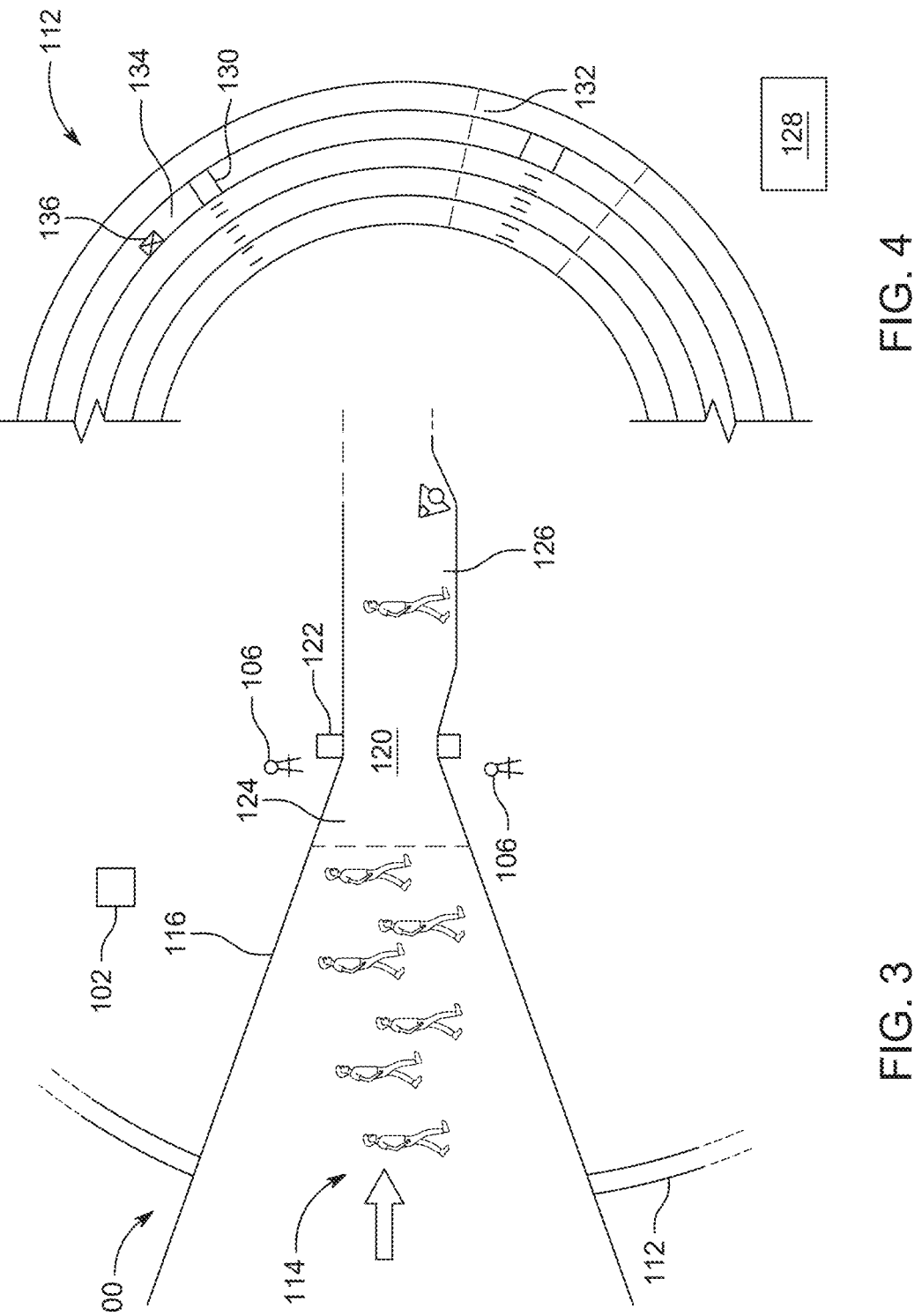
FIG. 3 is a top perspective view of the guided entryway of FIG. 2A, shown leading from a restricted-width event venue entry through a photo zone leading to an interior of the event venue.
FIG. 4 is a partial top plan view of an interior of an event area with stadium seating.

FIGS. 2A and 3 show an entryway configuration through a restricted-width entry area of a sporting or entertainment event venue such as a building door or gate. Referring now to FIGS. 2A, 3, and 4, system 100 is shown placed at a stadium 112. Stadium 112 includes one or more building entrances 114. An entryway, lane or chute 116 is placed at the entrance to guide spectators from the entrance towards one or more cameras 106. Chute 116 includes a barrier wall 118 that leads to restricted area 120. Chute 116 preferably includes a gantry 122 at an end furthest away from entrance 114, e.g., an exit. Gantry 122 includes one or more of cameras 106, which may be placed on a pole of the gantry, or separately of the gantry. Chute 116 further leads to a photo zone 124 just prior to gantry 122. Photo zone 124 is preferably an area where the spectators pass or move through while their picture is taken for purposes of a facial recognition identification (described further below). A detection sensor synced to one or more of cameras 106 may be configured to initiate image capture as at least one person encounters photo zone 124. Particular details of the detection sensor would be appreciated by those in the field. Examples of detection sensors include proximity sensors, photoelectric sensors, vision and imaging sensors, and even pressure and/or temperature sensors.

Preferably, for venues such as a sporting venue, chute 116 is devoid of any gates, arms, doors, or other barriers that force a person to stop while in the chute, such as shown in FIG. 2B. Chute 116 preferably has a minimum width to permit simultaneous entry of at least 2 people across (e.g., approximately 2 meters), and a preferred maximum width of 5 to 12 people across, more preferably a maximum width of 5 people across (e.g., 5 to 7 meters). Having a maximum width helps ensure that venue access is adequately controlled, so that venue security may act quickly should an unauthorised person attempt to enter, or if a person flagged as a known security concern attempts entry. A maximum width of 1 person across may be accommodated if appropriate, for example, as further described below with reference to FIGS. 6 and 7. If venue security is not a major concern, then people in groups as large as 500 may be individually identified simultaneously with little difficulty. Gantry 122 may include a panel with appropriate body scanning technology for walk-thru body scanning, described in more detail relative to the unrestricted-width configuration of FIGS. 6 and 7 below. The walk-thru body scanning preferably includes object shape detection for particular analysis of prohibited items.

FIG. 2B shows a system 200 with camaras 206 and a chute 216 without deployable doors or barriers to present a completely unimpeded path through the entrance. Chute 216 has a narrowing width in an entry direction to funnel people into a scanning and/or detection zone.

It will be appreciated that it is not always practical to position an image collection device directly in the path of an oncoming spectator. Processor 102 may be configured with one or more recognition algorithms suitable for side, or angled side profiles. Such algorithms may be modified to compare the distance between a point on the ear (e.g., concha or lobule) and a point on the eye (e.g., iris), and/or the distance between a point on the ear and a point on a nose (e.g., tip), and/or a ratio comparing the distance between a point on the ear and eye and the distance between a point on the ear and the nose. Where opposed cameras are used to capture left side, right side and/or oblique profiles of the spectator, the images captured by each camera may either be individually analyzed, or more preferably, merged to generate a composite image which is analyzed.

Referring to FIGS. 3 and 4, once the spectator is identified by processor 102, the spectator's personal profile 108 is checked for a presence of an item procurement and delivery, such as food, beverage, souvenir(s), clothing, and/or NFT(s). If personal profile 108 includes instructions for an item obtainment and/or delivery, then processor 102 sends instructions to item preparation module 128 to initiate preparing the item or article, and then arranging for the item delivery directly to the spectator's section 132, row 134 and seat 136, which may be at a time preselected by the spectator. Delivery of the item may be physically achieved by one or more venue employees by travel through seating area 130 leading to the spectator's seating area. Item delivery may be achieved in other ways as desired. For example, the use of drones (land and/or air-based) may be used as appropriate, or delivery to specific sections of the venue where the person may pick up the selected item. Electronic delivery may be achieved by sending a link to the person's electronic account, such as for delivery of an NFT.

As part of the profile stored in database 104, user or spectator preferences for items such as food, beverage, souvenirs, and/or NFTs may be used to enhance fan experience. For example, if a fan desires a beer at a particular time during the game or match, the preference may be noted in the profile so that the item may be provide or delivered directly to the fan or spectator at a desired time and location. As a further example, the fan may desire to have a beer 10 minutes into a football game or rugby match. The profile may include the preference data so that 10 minutes after the official start of the game or match, a beverage service station will commence delivery of the beer to the seat (section, row, seat number) of the fan or spectator. This has the advantage of eliminating standing in a long line or queue during a game or match break, and the fan or spectator potentially missing a crucial moment of the game or match due to standing in a line or queue. In short, by including an item pre-selection in the profile, the fan/spectator can "skip the line," reserving any potential waiting in line to actions such as going to the toilet when necessary.

With appropriate spectator permissions in place, system 100 may be configured to identify and track a wearable device on the spectator so that as the spectator makes their way to their seat in the sporting event, the system will track the spectator's position along the sporting event venue. Examples of wearable devices include, but are not limited to, an RFID chip, a smartphone, a watch, a device insertable in a shoe, and eyewear. The watch may include GPS circuitry and/or a wireless radio transmitter for network Wi-Fi communications and/or peer-to-peer communications, as will be further described below. A communications interface forming part of the system may be used to collect data via a communications means such as satellite, cellular technology, NFC, WLAN, and/or peer-to-peer communications (e.g., Bluetooth and/or Wi-Fi Direct) from the spectator as the spectator moves within the sporting venue. The spectator's movement data may be directly uploaded into the system from the spectator's own personal device. Where the wearable device utilises a peer-to-peer technology such as Bluetooth and/or Wi-Fi Direct, sensors with appropriately configured transceivers may be positioned within the sporting venue as appropriate for the communications range of such devices. Examples of suitable sensors include Bluetooth beacons. The details of Bluetooth beacons would be appreciated by those of ordinary skill in the art and are therefore not repeated here for simplicity.

Where multiple cameras are utilized, the cameras may be adapted to form a wired or wireless peer-to-peer network with each other and/or with processor 102. For example, each camera 106 may include a radio transceiver configured for Bluetooth and/or Wi-Fi Direct communications with other cameras and/or processor 102.

The identification is preferably made using solely the images of the spectator. Most preferably, the images are matched using facial recognition technology, the details of which would be appreciated by those of ordinary skill in the art. Examples of image recognition registration systems and methods are described in each of PCT Publication No. WO2019/079818, and PCT Publication No. WO2023/192002, the entire contents of each of which are incorporated by reference herein. If desired, more than one category of features may be used as part of the image recognition process. For example, facial features and at least one non-facial feature may be used to identify a user in a digital image captured during the sporting event. For example, a portion of an article of clothing may be used in combination with a facial feature to assist in identifying a user as a participant.

System 100 is preferably configured so that as one or more people move through photo zone 124, camera 106 gathers facial data of at least one person moving along a portion of the entryway. For example only, camara 106 may take a series of photos of the person or group of people, and processor 102 may be configured to analyze the image series and select an image therefrom that is primarily or best suited for facial recognition analysis. The series of pass-through images of a person may be expanded (or facial data collection expanded) so that as the person moves through the photo zone, the series is constantly updating the analysis of the series as the series is being expanded. The selection is based on a minimum quality threshold that preferably includes optical recognition of key facial data points, such as user eye location relative to user nose and/or cheek bone location. Processor 102 is configured to determine authorized entry and initiate item preparation/delivery as the person moves through the photo zone. For example, the facial recognition comparison and identification is conducted using the best-determined image or data from the image series as the person is moving through the photo zone (using a constantly updatable analysis of the image series as the image series is being expanded by the person moving through the photo zone). Once a minimum recognition threshold is achieved, and recognition is successful, further expansion of the image series or data collection is not needed for a particular identified individual unless used to double-check identification. The minimum threshold may be set at a suitable percentage, such as 90% accuracy, depending upon the accuracy desired for a particular purpose. High accuracy may be achieved by stationary positioning of individuals for facial recognition, both as a profile image and a later, at-venue comparison image. However, this greatly impacts efficiency of entrants getting to their seat on time, and is therefore less desirable.

Focusing the actual facial recognition analysis on a person of the group permits targeted matching of the person with their profile, to detect authorized event entry access and any item procurement for the particular person. It will be appreciated that concurrent individual facial recognition analyses of multiple members of the group may be conducted if needed. Additionally, the system may be configured with facial identification of less than all members to address privacy concerns related to facial identification of minors. For example, a primary entrant may have one or more associated persons, such as minors, linked to their entry so that a notification is provided to event staff at a terminal that the facially identified person has associated people as part of their entry. This permits the associated people entry as a group with a single with entry authorization. To enable efficient venue entry, a dedicated entrance for entrants having other people associated with the entry may be designated apart from main venue entrances (e.g., a "family entrance").

Other personal features may be used to identify a spectator in instances where the face may be partially or totally obscured. For example, head dimensions (for example, the distance between the ears), the distance between the ends of the shoulders, thermal imaging, and/or general body shape (for example, torso width and/or body height) may be used to help identify a spectator.

Spectator identification may be enhanced by incorporating pattern recognition and machine learning algorithms into the system. Behaviour and non-behaviour features may be analyzed to increase accuracy of identification. Examples of behaviour features include past attendance history in a sporting event (e.g., a spectator attending in an annual sporting event multiple times), calendar events (e.g., spectator travel periods, and sporting event type (e.g., NFL football games, rugby matches, European football (or soccer) matches, etc.). Examples of non-behavioural features include biometric data (e.g., age, gender, body build) and geolocation data (residential location, sporting event location). Behaviour, non-behaviour, or any combination behaviour and non-behaviour features may be used to enhance spectator identification.

The features may be weighted to increase accuracy. For example, attendance history may be given an initial weighting of 50%, geolocation may be given a weighting of 35%, calendar event(s) given a weighting of 10%, and biometric data given a weighting of 5%. Where geolocation is used as a factor, a spectator's residential address (obtained from profile 108) may serve as an initial a geolocation point with a fixed radius to define a surrounding target area. Sporting events located within the target area are given a higher weighting. Sporting events tending to match the spectator's past type of sporting event attendance (e.g., an NFL football game) are given a higher weighting. Pattern recognition may also be used to weight a spectator's likelihood of attending a particular event where the spectator has previously attended, with increased past attendance at an event being used to increase the weight given towards a particular event.

As a practical example, if an image of a spectator is captured at the venue entry, and the image is partially obscured, or the image only provides, for example, a 60% identification accuracy, processor 102 may utilize a secondary method of identification using, for example, an enhanced recognition algorithm with a feature set including attendance history, geolocation data, calendar event data and biometric data to increase the accuracy and positive identification rate. The processor may be configured to check whether the individual is already recognized, and if not, then scan the database for individuals who have a residence within the target area of the sporting event, who have attended in the current event (if it is a regular or annual event), who have a history of attending in the same or similar event type and distance, and biometric features such as gender, age, and body type. The features may be weighted and varied in order to optimize accuracy (e.g., geolocation being weighted more than event attendance history).

It will be appreciated that pattern recognition and machine learning may be implemented through appropriate classifiers, such as an artificial neural network. Support Vector Machine-Recursive Feature Elimination (SVM-RFE), and/or any of the techniques detailed in U.S. Pat. No. 10,013,638 and PCT Publication No. WO 2021/173871, the descriptions of each of which are hereby incorporated by reference herein, may be applied as appropriate to enhance spectator identification. The basic details of machine learning and pattern recognition methods would be understood by those of ordinary skill in the art and are therefore not repeated here for simplicity.

A brief description of elements of artificial intelligence, pattern recognition and machine learning are set forth below. Examples of features include face geometry, skin pigmentation, eye and/or hair color, hair follicle features (e.g., facial hair, nose hair, eyelashes, and/or scalp hair), detection of wrinkles, moles, and other facial features, and/or any of the features detailed above recited in relation to the enhanced recognition algorithm. Many of these features may involve numerical assignment for a set of characteristics within each feature type. Computer-extracted features typically include the image processing features calculated based on the pixels and grey levels related to the extracted areas.

Once a set of selection features has been generated, the set is preferably classified using a classifier. Classifiers are preferably used to assist in image matching between a pass-through photo, and a profile image. There are a variety of techniques suitable for use as a classifier. Suitable classifiers include, but at not limited to statistical applications (e.g., K-nearest neighbor, Bayesian classifiers, rank nearest neighbor, fuzzy pyramid linking, discriminant analysis, logistic regression, multivariant adaptive regression splines, support vector machine, and Hidden Markov Model), neural networks, decision trees, associated rule mining, and case-based reasoning, or a combination of any of the foregoing.

A neural network typically involves an artificial neuron, where a set of inputs is applied, each representing an output of another neuron. Each input is multiplied by a corresponding weight which is analogous to synaptic strengths in biological neurons. The weighted inputs are summed to determine the net input of the neuron. This net input is processed further by using a squashing function (activation function), to produce the neuron's output signal. This function may be linear, nonlinear (e.g., step function) or sigmoid (S-shaped). Different neural network topologies exist. The multi-layer perceptron neural network ("MLPNN") is used in a number of practical problems. It typically includes an input layer of neurons, one or more hidden layers of neurons, and an output layer of neurons. An example of neural network training is set forth in U.S. Pat. No. 10,013,638. The training example detailed in the '638 patent may be modified for adoption in enhancing spectator identification. Other applications may be used in place of, or in addition to a neural network as a final classifier. For example, the neural network may be substituted by SVM for final classification if desired. For some situations, processor 102 may be configured simultaneously with neural network trained for object detection, and a different neural network trained for facial recognition. A separate neural network configuration facilitates minimizing cyber security issues since different (optionally isolated) databases are limited to a designated neural network.

The platform may be configured, if desired, to detect the approach of a spectator using an electronic identification broadcast from the spectator's wearable device as they approach the photo zone. Upon detecting the approach of a spectator, the platform signals a communications hub at the photo zone to initiate the image capturing process described above. Contact details associated with the electronic identification broadcast may be provided by the spectator prior to the sporting event via their personal profile.

Having described the preferred components of system 100, a preferred method for controlling and expediting entry validation of entrants into a secured area of a sports or entertainment venue or transportation hub, or through a border crossing, will now be described. The method preferably includes purchasing an event entry (sports and entertainment), or a transportation ticket (e.g., airline ticket) online through a website. The entrant preferably already has their profile picture uploaded to their personal profile 108 (FIG. 1), which is associated with the ticket purchase. The picture is stored as facial data (e.g., by way of a template) in user image database 104.

In a transportation environment, the entrant, or passenger, shows up at the airport proceeds to a security checkpoint. The passenger loads their carryon item(s) onto the conveyor belt of the scanner and continues walking through the security checkpoint. While walking, the person walks through a photo zone where one or more images of the person are captured. The captured image(s) are compared to the images in database 104 to facially identify the person walking through the security checkpoint. The facial recognition procedure preferably utilizes Wild Facial Recognition, which is well-suited for in-motion facial recognition.

Processor 102 generates an identity confidence rating of the entrant. If it is determined that the identity confidence rating meets a predetermined minimum threshold (e.g., 95%, 98%, or 99%, or a subset thereof, e.g., 99.5%), then background profile data associated with the entrant is consulted to ascertain the entrant's risk rating. Those experienced in the security field will be familiar with methods of ascertaining entrant risk.

Based on the entrant risk rating, a visual display will display one of the following messages to security operating the checkpoint: permit the entrant to enter with a walk-thru body scan; deny the entrant entry to the venue; or divert the entrant to a full body scanner utilizing scanning technology for stationary persons (i.e., where the person remains substantially stationary on a platform while a scan is conducted).

In accordance with another preferred embodiment, a method 300 for contactless and/or ticketless mass spectator event venue entry validation and item delivery for facilitating expeditious and controlled entry of an influx of people to the spectator event without overwhelming event venue employees or resources will now be described with reference to FIGS. 1 to 5. The method preferably includes a step 302 of guiding at least one person from a group of people through chute 116 from a restricted-width entrance 114 of the event venue towards camera 106. Facial images of the person and/or group are captured as they move or pass through photo zone 124 along chute 116 in step 304.

Thereafter, in step 306, the pass-through facial images of the person and/or group taken in photo zone 124 are compared with the facial image of a person from the group to identify the person. In step 308, it is determined whether the person is authorized to enter the event venue once identified, by checking, for example, personal profile 108. If a person is authorized and their profile indicates other members of a group accompanying the person are authorized entrants, one or more of the other group members associated with the person may be permitted entry without facial identification. Preferably concurrently with step 308, in step 310, an item delivery is initiated to the seat allocated to the person once the person is identified and the person's attendance at the event venue is confirmed. The allocated seating may include a section number, row number, and seat number assigned to the person within the venue, which is particularly appropriate for stadium seating. If desired, seat allocation within a venue may be supplied to a smart device such as a smartphone after a person's entry into the venue is confirmed. The method may further include comparing the pass-through image of the group captured by camera 106 with images stored in a separate and independent security image database associated with security incidents using facial recognition technology to determine whether the person represents a security risk after security check against the security image database. A prohibited object scan may also be conducted concurrently with identification using a walk-thru body scanner to scan for prohibited objects, described in more detail for the unrestricted width configuration of FIGS. 6 and 7 below.

The foregoing description is by way of example only, and may be varied considerably without departing from the scope of the disclosure. For example only, the processor may be integrated with the camera within the same housing as the camera, substantially reducing system errors or opportunities for system disruptions from accidental wire disconnections. The chute may be configured in a variety of patterns to accommodate a particular venue entry, and need not be strictly linear in configuration. A variety of movements through the chute and/or photo zone may be accommodated, such as the person walking, running, or even a person in movement device/vehicle such as a wheelchair or scooter. For a person walking through the photo zone, the person is preferably walking at an ordinary human walking gait. Online resources such as those available through the Cleveland Clinic or Johns Hopkins University provide information around ordinary human walking gait.

Where platform 100 includes more than one image database, for example, user image database 104, and the security image database, processor 102 may be configured to concurrently compare the pass-through image with images from multiple image databases. Processor 102 may be configured to conduct at least one, more preferably, multiple, independent and simultaneous or concurrent determinations based on a successful facial recognition match as the person moves through the photo zone. For example, anywhere from one to at least three or more determinations may be concurrently made. Determinations may include any one or more of the following: whether the person is an authorized entrant into the event venue; whether the person represents a security risk after security check against a database of images associated with security incidents; and/or whether a profile associated with the profile image involved in the successful facial recognition match includes an item preparation instruction for preparation and delivery of an item either directly to the person at an event seating allocated to the person within the event venue or at a specific section of the venue where the person may pick up the item. Processor 102 may be configured to concurrently conduct multiple facial recognition comparisons between the group pass-through image, and images from different databases, and/or concurrently conduct one or more determinations upon a successful facial recognition match.

As shown in FIG. 3, to flag people who may attempt to enter a venue in an unauthorized way, who remain unidentified due to insufficient image quality, or are carrying a prohibited object, a verification bay 126 may be positioned off to the side of the chute after the photo zone as another secondary method of identification or object verification. Venue personnel may be alerted the presence of an unauthorized or unidentified person, and/or presence of a prohibited object, and direct that individual to the verification bay for identification, either with a portable image device to take an appropriate facial image, or other device to scan or collect details to identify the person and permit passage and entry of the person to the event as the situation warrants. In this situation, the system may use a combination of free-flowing (flow-thru) facial recognition with stationary facial recognition (as a fallback) to identify some individuals for whom the free-flowing facial recognition has not adequately or sufficiently produced a recognition of the person while the person is in motion. Whether an image is adequate for use in a facial recognition analysis may be based on a minimum threshold of accuracy when compared to user profile image. For example, an image may be deemed sufficient if it has an accuracy above 60%, more preferably, above 70%, and most preferably above 90%. Additional photo zones may be serially added as needed to reduce possible entry of unidentified people. Elements of Artificial Intelligence may be used to help identify people if a confidence score is not sufficiently high enough, or meet a predetermined minimum threshold.

If desired, an item procurement, or additional item procurement, may be facilitated once a person is seated within the venue through use of an App on the person's smartphone. Procurement may be facilitated through facial recognition technology (using the smartphone's camera), and item delivery facilitated by the smartphone GPS circuitry, and/or allocated seating associated with the person.

Figure 6:
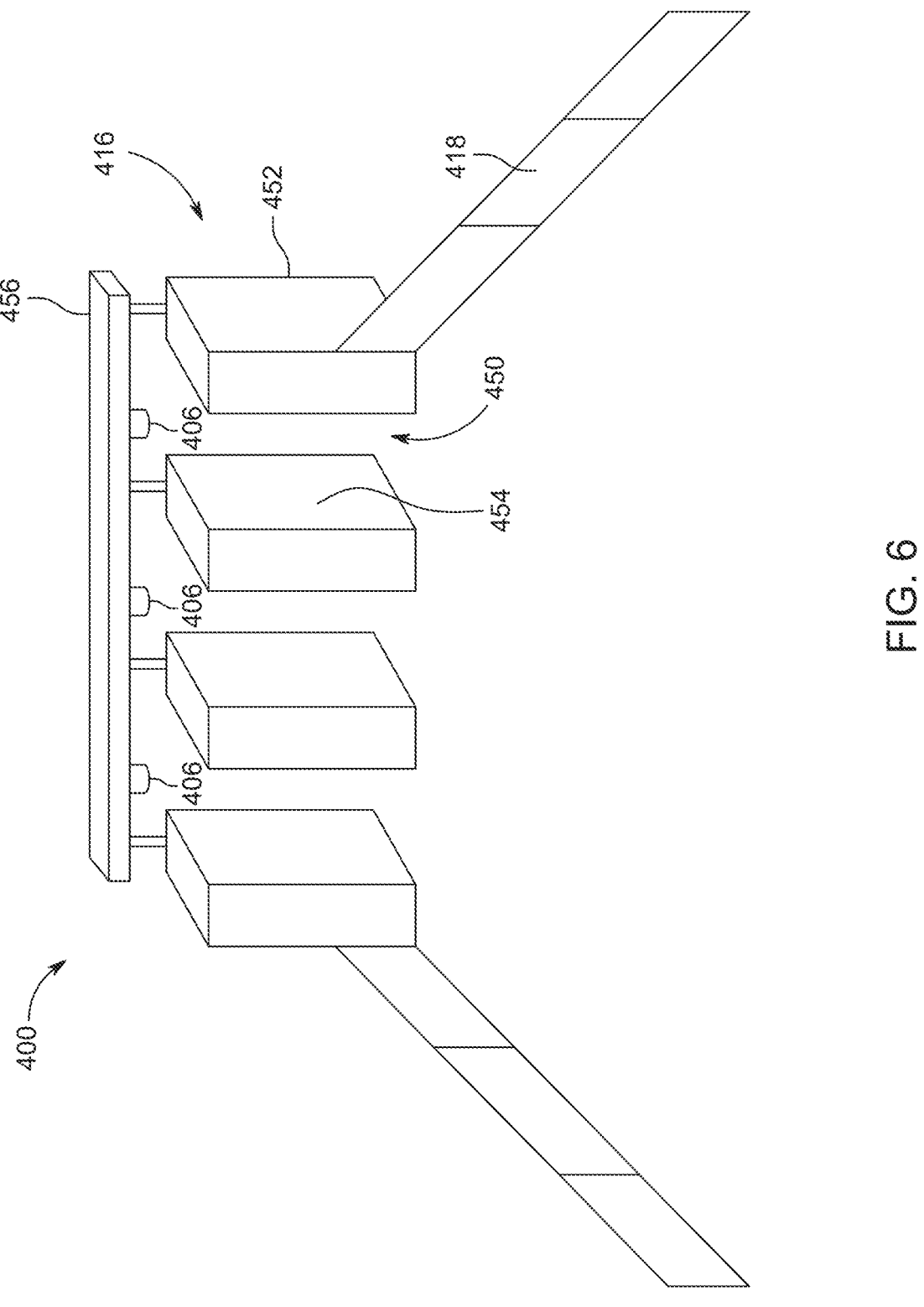
FIG. 6 is a front perspective view of a guided entryway in an unrestricted-width configuration including a series of chutes having integrated full body scanning technology in combination with a series of cameras used for capturing images for use in facial recognition analysis.
Figure 7:
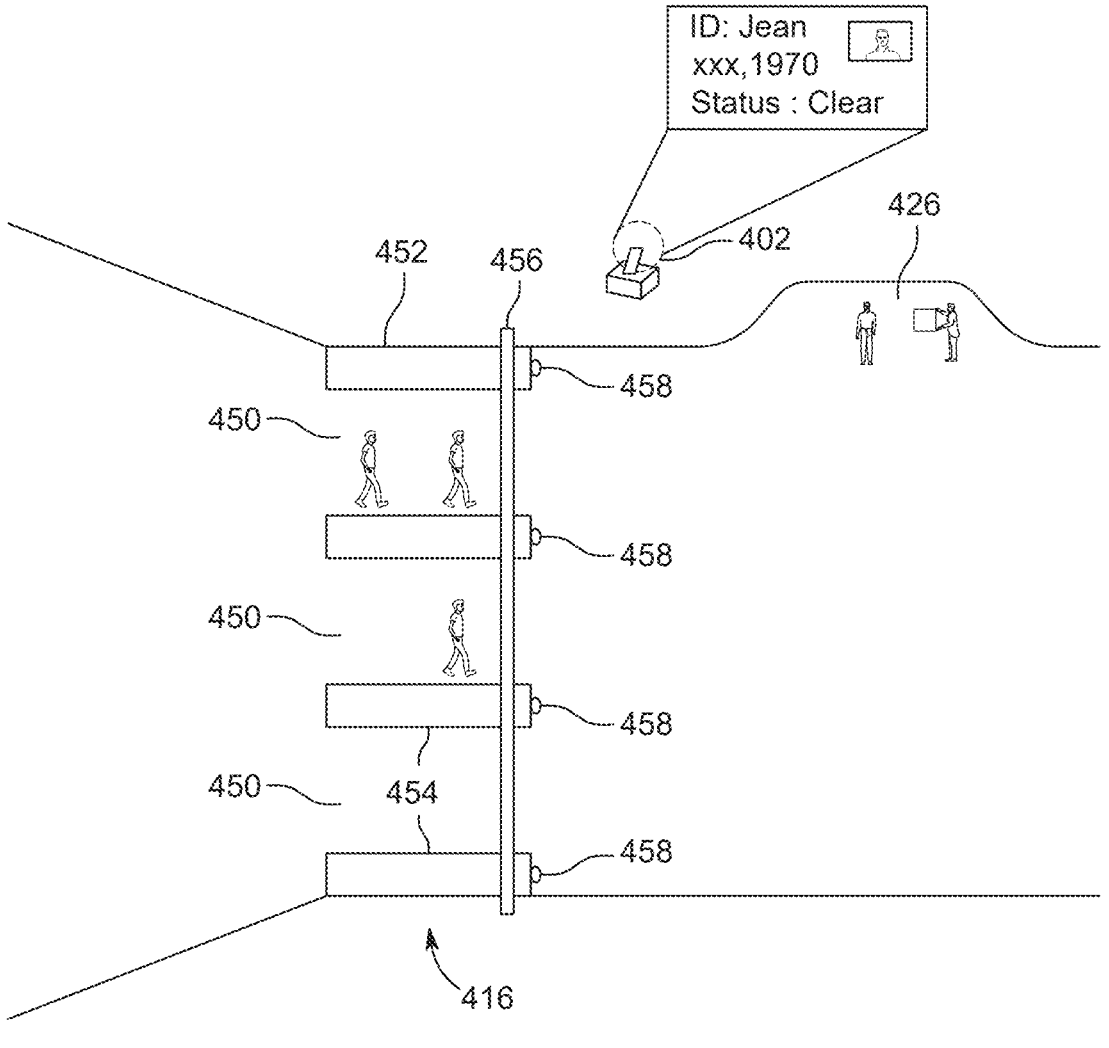
FIG. 7 is a top perspective view of the guided entryway of FIG. 6, shown leading from an event venue entry through chutes leading to an interior of the event venue.

FIGS. 6 and 7 show a system 400 configured for enhanced security in spaces able to accommodate an unrestricted, wider entry configuration (e.g., an area outside of a stadium). In particular, system 400 includes utilization of walk-thru body scanning technology in combination with facial recognition identification to seamlessly and concurrently scan for dangerous or prohibited items or objects while identifying a person, the scanning and identification overlapping each other while the person moves along a portion of an entryway 416. Referring to FIG. 6, entryway 416 preferably includes a pedestrian barrier 418 leading to at least one, more preferably, multiple chutes 450. Each chute includes elongated barriers 452 that include opposed walls 454. Each barrier preferably has a length longer than a width, and a height in the range of 1 meter to approximately 2.5 meters, for example, 7 feet tall (2.1 meters). The length may be in the range of 0.75 meters to 3 meters, and a width of 0.1 meters to 1 meter. The aforementioned dimensions are exemplary only, and may be altered depending upon the intended use situation and environment. Referring to both FIGS. 6 and 7, each chute 450 includes an entrance and an exit. Proximate the exit, a crossbeam 456 stretches across the with and along the top of entryway 416. Crossbeam 456 includes multiple cameras 406, each camera being positioned with a field of view spanning the distance between the opposed walls of the chute. It will be appreciated multiple cameras may be provided for each chute, with one or more being along or within one or both of walls 454 of each barrier 452. Additional cameras may be positioned medially and/or laterally (left and/or right) of the entryway, and/or forward of the entryway. Proximate the entryway, one or more cameras may be positioned at a lower elevation so that the digital entry image is captured at an angle below a horizontal plane intersecting a chin of the spectator, or where desired, below a horizontal plane intersecting a waist of a spectator. Other camera angles may be used as desired.

Entryway 416 preferably includes walk-thru body scanners within one or more of elongated barriers 452. Preferably, the body scanners are configured as full body scanners, the details of which would be appreciated by one of ordinary skill in the field, and for simplicity, are not repeated here. An example of a full body scanner suitable for the configuration of elongated barrier 452 is one that utilizes backscatter X-ray scanning technology. Magnetic field scanning may be adapted as appropriate for a given situation. An example of a magnetic field scanner is described in U.S. Pat. No. 11,232,700, the disclosure of which is incorporated by reference herein. Millimeter wave scanning technology may be utilized in situations where chute 452 includes a moving floor, such as a conveyor belt, with a rotating ring portion on the floor configured to conduct a millimeter wave scan while the person is moved along the chute on the conveyor belt and would be an appropriate configuration for an airport security environment.

The body scanner is configured to conduct the body scan, and communicate the data to processor 402. Processor 402 receives the data from the body scanner, and determines the presence of any prohibited object or weapon being carried by the person being scanned. Examples of weapons can include guns of various types and makes, knives or other sharp instruments, and canisters containing liquids and/or potentially harmful substances. Examples of prohibited objects other than weapons include, but are not limited to, food and/or beverages purchased outside the venue. Easily scannable beverage objects include bottles and aluminium cans. Attributes of artificial intelligence, similar to that described above, may be used to identify and classify items as prohibited or dangerous, or identify an item as a potential weapon, as opposed to metallic articles such as artificial limbs, pens, or smartphones. Processor 402 preferably also receives image data from cameras 406, and conducts facial recognition analysis such as already described above in relation to processor 102.

Preferably, the width of each chute 450 is configured to accommodate a standard width of a human (approximately, exterior shoulder to exterior shoulder, plus a few inches of width). By having a reduced width, the orientation of the entryway prompts people to form single-file lines to enter each chute, which reduces tracking complexities for the facial recognition analysis. A single-file line also facilitates management of security risks. For example, if a security risk is detected and associated with a person traversing one of the chutes, that person may be more easily diverted to a verification bay 426, or a venue exit as appropriate. It will be appreciated that the width of each chute 450 may be expanded to accommodate multiple people at the same time (e.g., 2 to 5 across) if desired in situations involving entry of large crowds through limited entrances, and security risk is less of a concern.

In use, one or more people enter entryway 416 and enter one of the chutes. As the person walks or otherwise moves though the chute, a body scan is conducted on that individual to detect the presence of any contraband or prohibited items or articles into the venue (entertainment venue, sporting venue, transportation venue (e.g., airport)). Processor 402 receives the scan data, and preferably utilizing principles of artificial intelligence, identifies items being carried by the person, and classifies the items as dangerous, prohibited, or acceptable. It will be appreciated that additional or other classifications are possible as appropriate. The determination of a banned object may be based on detected object shape and/or material composition.

Simultaneously, or at least preferably concurrently in part along a part of the person's traversal along the chute, an image is captured by camera 406 for use in a facial recognition analysis by a processor, either resident on the camera itself, or at processor 402. The image capture preferably occurs after the walk-thru body scan is initiated so that as the person navigates through entryway 416, they will be looking ahead, which increases the likelihood of obtaining adequate facial data by camera 406 to achieve a minimum accuracy threshold score, e.g., 90%, 95%, or 99%, depending upon a sensitivity threshold selected. Determination of entry authorization is preferably concluded before the person completes walking through the walk-thru body scanner. Although it is preferred that the walk-thru body scan and in-motion identification overlap, the system may be configured so that walk-thru scan is concluded shortly before any identification is initiated, or visa versa depending upon the needs of a particular venue.

It will be appreciated that any analysis may be conducted remotely, or in a cloud computing environment if desired. The determination around presence of prohibited items may be conducted simultaneously with the facial recognition identification of the person. A positive determination of a prohibited item, and/or a failure to identify the person (or if the person has been identified as a security risk after a check with a database of known people who pose security risks) will cause processor 402 to issue an alert or warning regarding the person which is subject of the alert. Such a warning may be simply signalling an indicator or light 458, preferably located at the rear face of crossbeam 456 shown in FIG. 7, to show a red color, or appropriate text. Otherwise, a determination that the person is not taking prohibited articles into the venue, and has been successfully identified (and authorized) to enter the venue will cause indicator 458 to show a green color, or appropriate text.

In instances where a warning is issued, the person associated with the warning may be directed to a verification bay 426 for either a secondary identification check and/or scan, or directed to a venue exit if it is determined that the person is simply not authorized to enter.

To enhance security, a bag check may be included with appropriate scanners to detect items brought by visitors to the venue which could pose a risk to other people at the venue, or attempts by visitors to bring in prohibited items into the venue (e.g., weapons, cameras, recording devices, food and/or beverages, etc.). An example of an appropriate scanner may include a package verification scanner. The package verification scanner may be positioned adjacent the full body scanner if desired. The package verification scanner may be configured as a Gamma-ray sensor that can utilize a Co-60 isotope or CS-137 isotope as the radiation source.

The foregoing description is by way of example only, and may be varied considerably without departing from the scope of the disclosure. For example only, a facial recognition comparison can be conducted sequentially, or concurrently with a body scan, whether a stationary or in-motion body scan. In either case (sequential or concurrent body scan and facial recognition identification), concurrent package or luggage verification may be conducted through a scanner (in-motion or stationary). If desired, a facial identification may be conducted before a walk-thru body scan.

It will be appreciated that aspects of the platform may be configured for venues other than sporting and entertainment venues just described. For example only, the platform may be configured for security and identification applications at venues such as an airport, spaceport, border crossing, or any entrance to a building or area where security and identification is required. In an airport setting or environment, the free-flow of people into the airport without waiting helps ensure more timely operations. Reduction of potential wait times also reduces stress on the part of tardy passengers attempting to reach a gate on time.

If desired, an entry swap or ticket swap option may be included so that if a person cannot attend the event, that person may transfer their entry to another person. The other person may then provide their profile image, and the change or transfer updated to reflect proper association of the entry with the new, other person. A venue or event operator may associate a fee to carry out the transfer.

Information or data normally stored at a physical location may be stored in the Cloud, considerably reducing the hardware needed for memory requirements often associated with large volumes of data.

The features described with respect to one embodiment may be applied to other embodiments, or combined with or interchanged with the features of other embodiments, as appropriate, without departing from the scope of the disclosure.

The present disclosure in one or more preferred forms provides the advantages of confirming entry of attendees into a mass attendance event in a seamless, free-flowing manner and reduced opportunity for error. This permits better allocation of human resources and reduces material waste. For example, labor costs are reduced by lessening a need for ticket-checkers at all entrances. Products may be better stocked based on anticipated sales, an indication of which would be provided from personal profiles associated with attendees. Being able to accurately or more precisely predict needed supplies reduces overstocking, wastage, and associated expenditures. Where security features are included in the platform, crowd safety is improved by identifying and excluding people from the event who are associated with known security incidents, or who represent a security risk.

A combined security scan and identity check/verification significantly reduces wait times, while minimizing resources required to perform a separate security scan and ID check. When a person is in a hurry, such as an airport environment where a person might be running late to catch a flight, such a time savings can make the difference. For sports and entertainment venues, getting a large number of people safely and expeditiously to their assigned seat generally promotes a better experience for those attending the event.

From an attendee's or spectator's perspective, more freedom is provided to attend and focus on the event without worrying about standing in long lines for event entry and/or concession item procurement. Using a single image recognition event for both venue entry and item procurement significantly reduces time otherwise needed for various actions, streamlines the entire experience, and reduces expenditure by the venue operator. The contactless and ticketless nature of the system and method reduce disease or viral transmission risk, an important consideration for mass attendance events during a pandemic. These advantages are particularly pronounced with free-flowing image or facial recognition, where a person may enter a venue without stopping while being identified. This is in contrast to traditional entry systems that utilize a form of "stop-and-go" entry, whereby the person must first stop to be identified or verified, and only permitted to continue once identified. Concurrent in-motion facial recognition and object security scanning permits entry of a group of people into a restricted area in an extremely efficient manner, and in a manner further minimizing or eliminating wait times. In modern society, waiting in lines is increasingly disfavoured, and a combined person identification and entry validation, and prohibited item scan permits entry of large numbers of people into restricted access venues while helping ensure a safe, secure environment. It will of course be appreciated by those of ordinary skill in the art that various benefits and advantages may be obtained without incorporating all elements or features described herein.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. An expedited sports or entertainment venue entry platform to validate people into a spectator event at the venue, comprising:

a guided entryway including an entrance, an exit, a first sidewall and an opposed second sidewall, at least one of said sidewalls extending from the entrance to the exit, at least one of said sidewalls including a panel with a walk-thru body scanner configured detect an object having characteristics matching predetermined characteristics of one or more items on a banned item list;

a facial data collection device configured to gather facial data of at least one person moving along a portion of the entryway;

a detection sensor synced to said facial data collection device to initiate data capture with said device as the person encounters a detection zone to activate said sensor;

a user image database configured to store profile image data of the person prior to commencement of the event, the profile image data representing the person in a stationary pose; and a processor configured to:

compare any object detected by said walk-thru scanner with predetermined characteristics of an object on a banned object list to determine if the person is carrying a banned object;

compare the profile image data stored in said user image database with the facial data of the person in motion captured by said facial data collection device using wild facial recognition technology;

determine, as the person is moving through the entryway, whether the person is:

an authorized venue entrant based on the comparison between the profile image data and the in-motion facial data; and carrying a banned object; and issue an alert regarding the person attempting entry to the venue after determining that the person is carrying a banned object and/or is an unauthorized entrant to the venue; and

process a facial authentication concession food or beverage order associated with the person after the person is successfully identified as an authorized entrant, the facial authentication order and authorized entry determination being based on the same profile image data of the person.

2. The platform of claim 1, wherein the banned object determination and unauthorized entry determination occur simultaneously.

3. The platform of claim 1, wherein the banned object determination and unauthorized entry determination are configured to conclude before the person reaches the exit.

4. The platform of claim 1, wherein at least one of the walls has a length different compared to an opposite wall.

5. The platform of claim 1, wherein said walk-thru body scanner is configured to detect an object shape, said processer being configured to analyze the shape and determine if the shape matches a shape of a prohibited object.

6. The platform of claim 1, wherein facial data collection device is placed after the walk-thru scanner in a direction of travel through the guided entryway.

7. The platform of claim 1, wherein the opposed first and second sidewalls are at least 2 meters apart to permit at least two people to walk side-by-side through the walk-thru body scanner.

8. An expedited sports or entertainment venue entry platform to validate people into a spectator event at the venue, comprising:

a guided entryway including an entrance, an exit, a first sidewall and an opposed second sidewall, at least one of said sidewalls extending from the entrance to the exit, at least one of said sidewalls including a panel with a walk-thru body scanner configured detect an object having characteristics matching predetermined characteristics of one or more items on a banned item list;

a facial data collection device configured to gather facial data of at least one person moving along a portion of the entryway;

a detection sensor synced to said facial data collection device to initiate data capture with said device as the person encounters a detection zone to activate said sensor;

a user image database configured to store profile image data of the person prior to commencement of the event, the profile image data representing the person in a stationary pose; and a processor configured to:

compare any object detected by said walk-thru scanner with predetermined characteristics of an object on a banned object list to determine if the person is carrying a banned object;

compare the profile image data stored in said user image database with the facial data of the person in motion captured by said facial data collection device using wild facial recognition technology;

determine, as the person is moving through the entryway, whether the person is:

an authorized venue entrant based on the comparison between the profile image data and the in-motion facial data; and carrying a banned object; and issue an alert regarding the person attempting entry to the venue after determining that the person is carrying a banned object and/or is an unauthorized entrant to the venue, wherein said processor is configured to determine simultaneously whether multiple people are authorized entrants to the venue.

9. A method for expediting validation of a person through entry into a sports or entertainment venue, comprising:

guiding the person to move through a walk-thru body scanner;

scanning, with the walk-thru body scanner, the person to detect presence an object having at least one characteristic matching a characteristic of an object on a banned object listing;

collecting facial data, with a facial data collection device, of the person as they move through the walk-thru body scanner;

determining, with a wild facial recognition technology comparison between profile image data and in-motion facial data, whether the person is an authorized venue entrant as they move through the walk-thru body scanner;

issuing an alert regarding the person if the person is carrying a banned object or is attempting an unauthorized entry into the venue; and processing a facial authentication concession food or beverage order associate with the person after the person is successfully identified as an authorized entrant, the facial authentication order and authorized entry determination being based on the same profile image data of the person.

10. The method of claim 9, wherein the determination of a banned object is based on a detected object shape.

11. The method of claim 9, wherein the determination of a banned object is based on a detected object material composition.

12. The method of claim 9, wherein authorization for entry into the venue is determined before the person completes walking through the walk-thru body scanner.

13. An expedited sports or entertainment venue entry platform to validate people into an event at the venue, comprising:

at least one elongated barrier having a vertical height greater than a width, said barrier including a walk-thru body scanner configured detect an object having characteristics matching predetermined characteristics of one or more items on a banned item list;

a facial data collection device configured to gather facial data of individuals in a group moving towards an entry of the venue;

a detection sensor synced to said facial data collection device to initiate data capture with said device as at least one person of the group encounters a detection zone to activate said sensor;

a user image database configured to store profile image data of people prior to commencement of the event, the profile image data representing at least one person in a stationary pose originating from a user device;

a security image database including facial image data associated with a prior security situation; and a processor configured to:

compare any object detected by said walk-thru scanner with predetermined characteristics of an object on a banned object list to determine if at least one person of the group is carrying a banned object;

concurrently compare the profile image data stored in said user image database and the facial data in said security image database with the facial data of the individuals in motion captured by said facial data collection device using wild facial recognition technology with an identification accuracy of at least 90% to facially identify one or more of the individuals in motion;

simultaneously determine, as individuals are moving towards the entry, whether at least one person of the group is:

an authorized venue entrant based on the comparison between the profile image data and the in-motion facial data; and carrying a banned object; and issue an alert regarding the person if the person is at least one of:

carrying a banned object; or is attempting an unauthorized entry into the venue.

14. The platform of claim 13, wherein said user image database includes personal profile data, one or more aspects of the personal profile data being configured to self-delete after at least one of a predetermined amount of time and an event.

15. The platform of claim 13, wherein said processor is configured to determine, concurrently with determination of authorized venue entry and carrying of a banned object, whether a profile associated with the profile image data involved in a successful facial recognition match includes an item preparation instruction for preparation and delivery of an item either directly to a person at an allocated event seating or at a specific section of the venue for item pick up.

16. The platform of claim 13, wherein said walk-thru body scanner is configured to detect an object shape, said processer being configured to analyze the shape and determine if the shape matches a shape of a prohibited object.

17. The platform of claim 13, wherein said facial data collection device is placed after the walk-thru scanner in a direction of travel through a guided entryway.

18. The platform of claim 13, further comprising at least a second elongated barrier, wherein the elongated barriers are at least 2 meters apart to permit at least two people to walk side-by-side between the barriers.

19. The platform of claim 13, wherein said processor is configured to determine simultaneously whether multiple people are authorized entrants to the venue.

* * * * *